US011263467B2

(12) United States Patent
Kornienko et al.

(10) Patent No.: US 11,263,467 B2
(45) Date of Patent: Mar. 1, 2022

(54) IMAGE PROCESSING

(71) Applicant: Apical Limited, Cambridge (GB)

(72) Inventors: Alexey Kornienko, Loughborough (GB); David Hanwell, Stapleford (GB)

(73) Assignee: Apical Limited, Cambridge (GB)

( * ) Notice: Subject to any disclaimer, the term of this patent is extended or adjusted under 35 U.S.C. 154(b) by 57 days.

(21) Appl. No.: 16/412,779

(22) Filed: May 15, 2019

(65) Prior Publication Data

US 2020/0364481 A1 Nov. 19, 2020

(51) Int. Cl.
*G06K 9/20* (2006.01)
*G06K 9/32* (2006.01)
*G06T 3/40* (2006.01)

(52) U.S. Cl.
CPC ......... *G06K 9/2054* (2013.01); *G06K 9/3233* (2013.01); *G06T 3/40* (2013.01)

(58) Field of Classification Search
CPC ....... G06K 9/2054; G06K 9/3233; G06T 3/40
See application file for complete search history.

(56) References Cited

U.S. PATENT DOCUMENTS

| | | | | |
|---|---|---|---|---|
| 9,858,470 B2* | 1/2018 | Kang | ................ | G06K 9/00228 |
| 10,776,665 B2* | 9/2020 | Chen | ................. | G06K 9/00771 |
| 2003/0179294 A1* | 9/2003 | Martins | .................... | G06K 9/32 |
| | | | | 348/157 |
| 2010/0289904 A1* | 11/2010 | Zhang | .................... | H04N 7/148 |
| | | | | 348/207.1 |
| 2013/0272504 A1* | 10/2013 | Deutsch | ................... | G21K 1/04 |
| | | | | 378/150 |
| 2015/0035975 A1* | 2/2015 | Shreve | .................... | G06Q 20/30 |
| | | | | 348/143 |
| 2016/0133002 A1* | 5/2016 | Rhee | .................. | G06K 9/00281 |
| | | | | 382/103 |
| 2017/0231550 A1* | 8/2017 | Do | ....................... | G06K 9/4652 |
| | | | | 382/128 |
| 2017/0353699 A1* | 12/2017 | Wang | .................. | H04N 5/23245 |
| 2018/0260649 A1* | 9/2018 | Kadambe | ................. | G06K 9/20 |
| 2019/0025853 A1* | 1/2019 | Julian | ....................... | G06T 7/74 |
| 2019/0042860 A1* | 2/2019 | Lee | .................... | G06K 9/00798 |
| 2019/0050993 A1* | 2/2019 | Jang | .................... | G06K 9/6271 |
| 2019/0057588 A1* | 2/2019 | Savvides | ............ | G06K 9/00771 |
| 2019/0108410 A1* | 4/2019 | Zhang | ................ | G06K 9/00255 |
| 2019/0228275 A1* | 7/2019 | Smilansky | .......... | G06K 9/00624 |
| 2019/0251372 A1* | 8/2019 | Dwivedi | ............ | G06K 9/00798 |
| 2019/0370591 A1* | 12/2019 | Chang | ................ | G06K 9/00228 |
| 2020/0175290 A1* | 6/2020 | Raja | .................... | G06K 9/00899 |

\* cited by examiner

*Primary Examiner* — Brenda C Bernardi
(74) *Attorney, Agent, or Firm* — EIP US LLP

(57) ABSTRACT

The present disclosure provides an image processing apparatus and system which downscales an image which is generated from data provided by a sensor. The downscaled image is then analyzed to determine the location of one or more regions of interest in the image. The regions of interest can then be cropped from the original image and those cropped regions of interest processed by a computer vision engine.

16 Claims, 5 Drawing Sheets

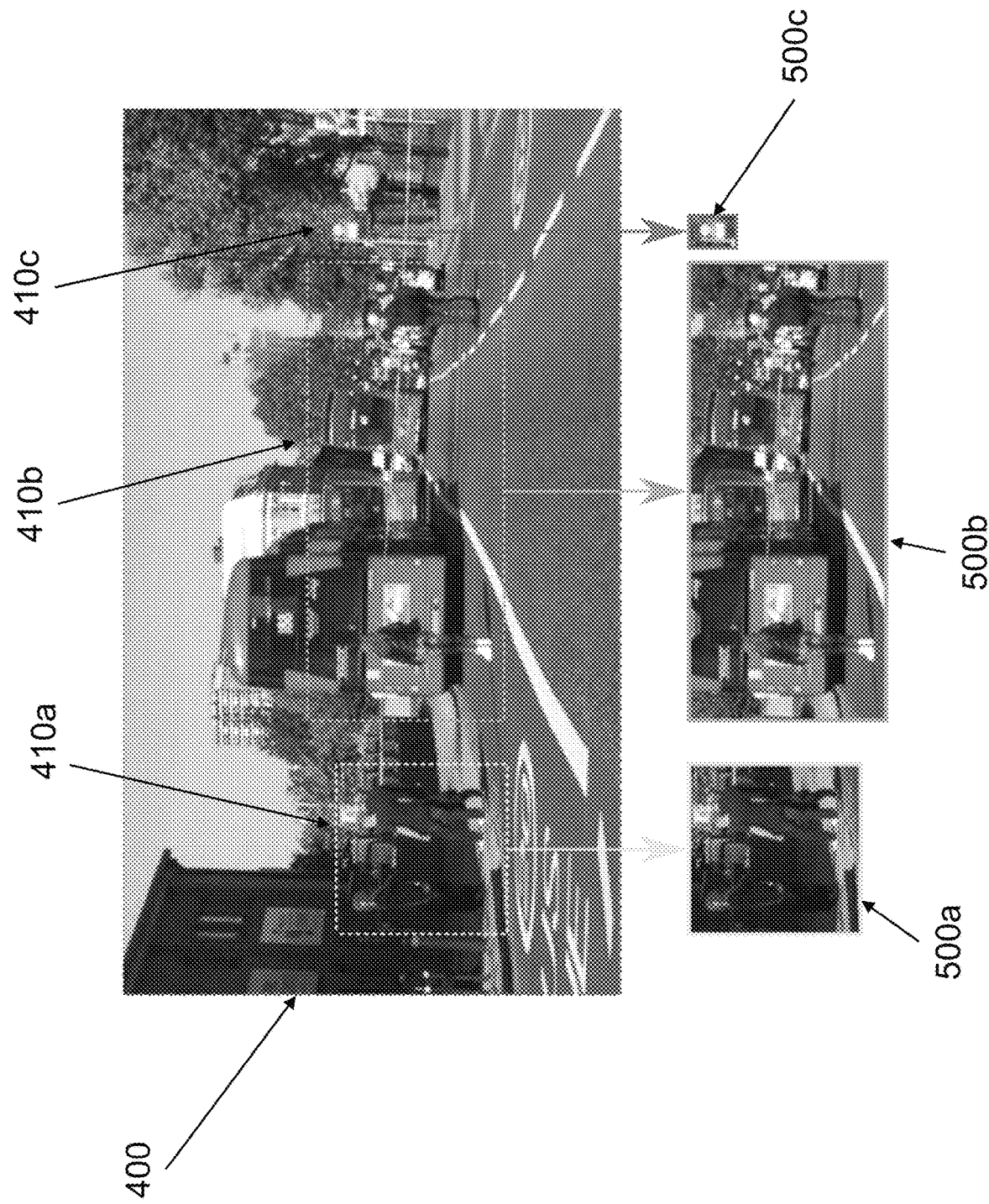

IMAGE PROCESSING

BACKGROUND OF THE INVENTION

Field of the Invention

The present disclosure relates to an apparatus and method for processing an image and in particular to apparatus and method of selecting regions of an image for processing.

Description of the Related Technology

FIG. 1 shows a schematic depiction of an example of a known image processing system 100 which comprises a sensor 110 (such as a camera or other sensor device), an image signal processor (ISP) 120, a computer vision engine 130 and system memory 140. In use, data from the sensor is fed to the ISP, which performs a number of processes in order to produce a high quality image, such as, for example, de-noising, de-mosaicing, color management, and tone-mapping. The resulting image is then stored in the system memory. The stored image is then accessed by the computer vision engine 130 where one or more computer vision algorithms are applied to analyze the image. Such an image processing system may be used in advanced driver assistance systems (ADAS), autonomous vehicles, augmented reality (AR) headsets, facial recognition systems, etc.

SUMMARY

According to a first aspect of the present disclosure there is provided an apparatus for processing an image, the apparatus comprising an image processor, an image post-processor and a computer vision engine, wherein in use the apparatus is configured such that: the image processor receives data from a sensor; the image processor generates an image at a first resolution; the image post-processor downscales the image to a second resolution, wherein the second resolution is lower than the first resolution; the computer vision system analyzes the image at the second resolution to detect one or more regions of interest in the image; the image post-processor generates one or more extracts of the image at the first resolution, the or each extract being generated in accordance with the one or more detected regions of interest. The image post-processor may comprise an image scaler, which may be configured to dynamically vary the downscaling applied to the image generated at a first resolution by the image processor. The image post-processor may comprise a plurality of image croppers, wherein one or more of the plurality of image croppers may receive data defining a region of interest from the computer vision system, the one or more image croppers generating an extract of the image at the first resolution in accordance with the received data. The plurality of image croppers may be configured to transform the extract of the image such that the extract has a predetermined size.

The apparatus may further comprise system memory and the image post-processor may be configured to write the image at the second resolution to the system memory such that the computer vision system can analyze the image at the second resolution. The one or more extracts of the image at the first resolution are written to the system memory such that the computer vision system can analyze the one or more extracts of the image at the first resolution. The apparatus may further comprise one or more sensors.

According to a second aspect of the present disclosure there is provided a method of image processing, the method comprising: receiving data from a sensor at an image processor; processing the data received from the sensor to generate an image, the image having a first resolution; processing the image having a first resolution such that it has a second resolution, wherein the second resolution is less than the first resolution; analyzing the image having a second resolution to detect one or more regions of interest in the image; and extracting the one or more regions of interest from the image having a first resolution. The one or more regions of interest extracted from the image having a first resolution may be analyzed by a computer vision engine. The image having a second resolution may be analyzed by the computer vision engine to detect the one or more regions of interest in the image.

Data may be received from the sensor such that the image processor generates a sequence of images each having a first resolution, the method further comprising: processing an image from the sequence of images, such that the image has a second resolution, wherein the second resolution is less than the first resolution; analyzing the image having a second resolution to detect one or more regions of interest in the image; and extracting the one or more regions of interest from the subsequent image from the sequence of images.

A plurality of regions of interest may be combined into a single region of interest. One or more of the regions of interest may be transformed such they correspond to a predetermined number of pixels.

According to a third aspect of the present disclosure there is provided an image processing system, the image processing system comprising: a sensor; an image processor configured to receive data from the sensor and to generate an image having a first resolution; an image post-processor configured to transform the image such that it has a second resolution, such that the second resolution is less than the first resolution, and to write the transformed image to a system memory; one or more processors configured to analyze the transformed image to detect one or more regions of interest and to send data identifying the one or more regions of interest to the image post-processor; the image post-processor being further configured to extract the one or more regions of interest identified by the one or more processors from the image having a first resolution and to write the one or more extracts of the image having a first resolution to the system memory; wherein the one or more processors are further configured to analyze the one or more extracts of the image having a first resolution written to the system memory.

BRIEF DESCRIPTION OF THE DRAWINGS

FIG. 5 shows a pictorial depiction of the regions of interest which have been extracted from the high quality image.

DETAILED DESCRIPTION OF CERTAIN INVENTIVE EMBODIMENTS

Figure 1:
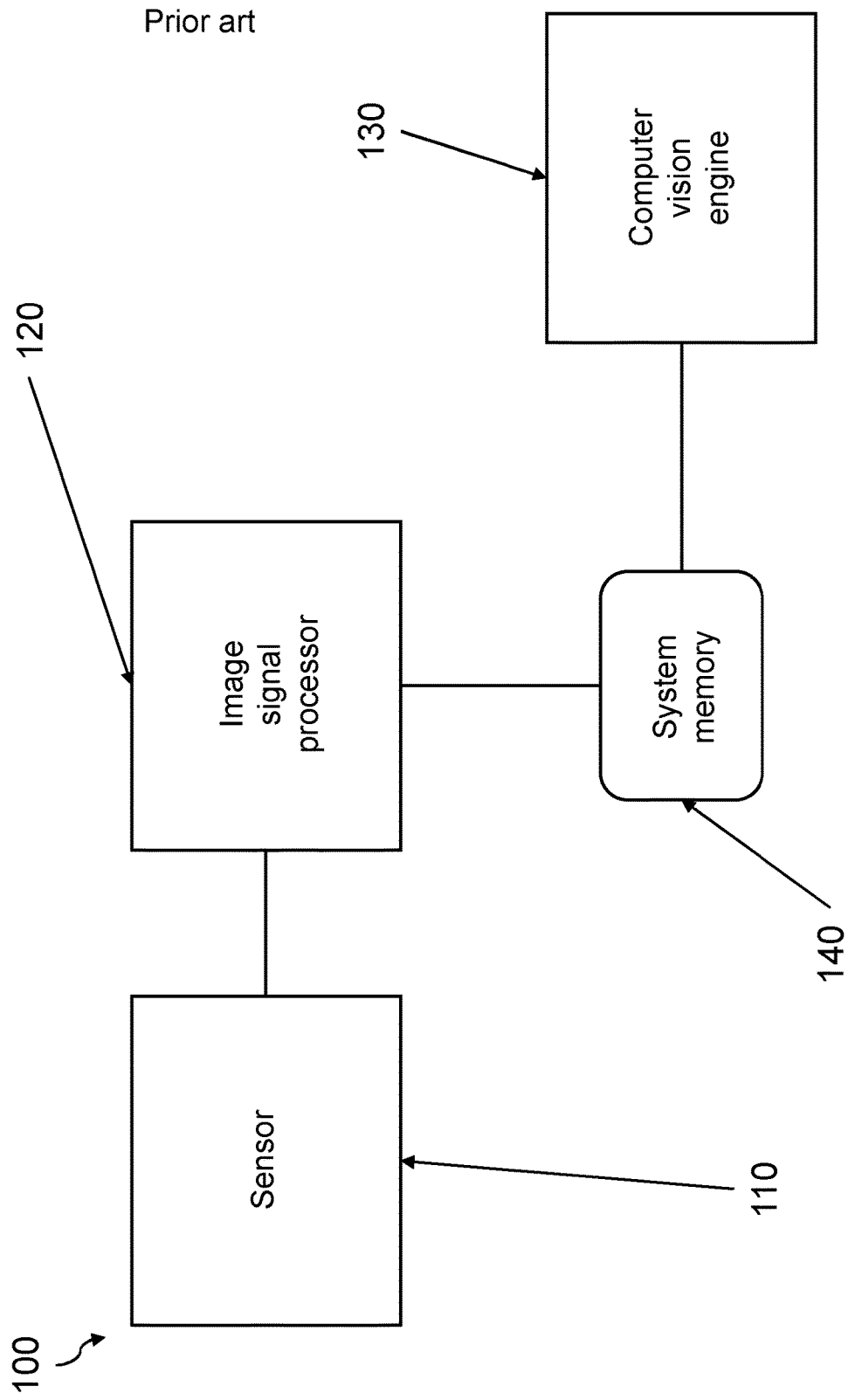
FIG. 1 shows a schematic depiction of an example of a known image processing system.
Figure 2:
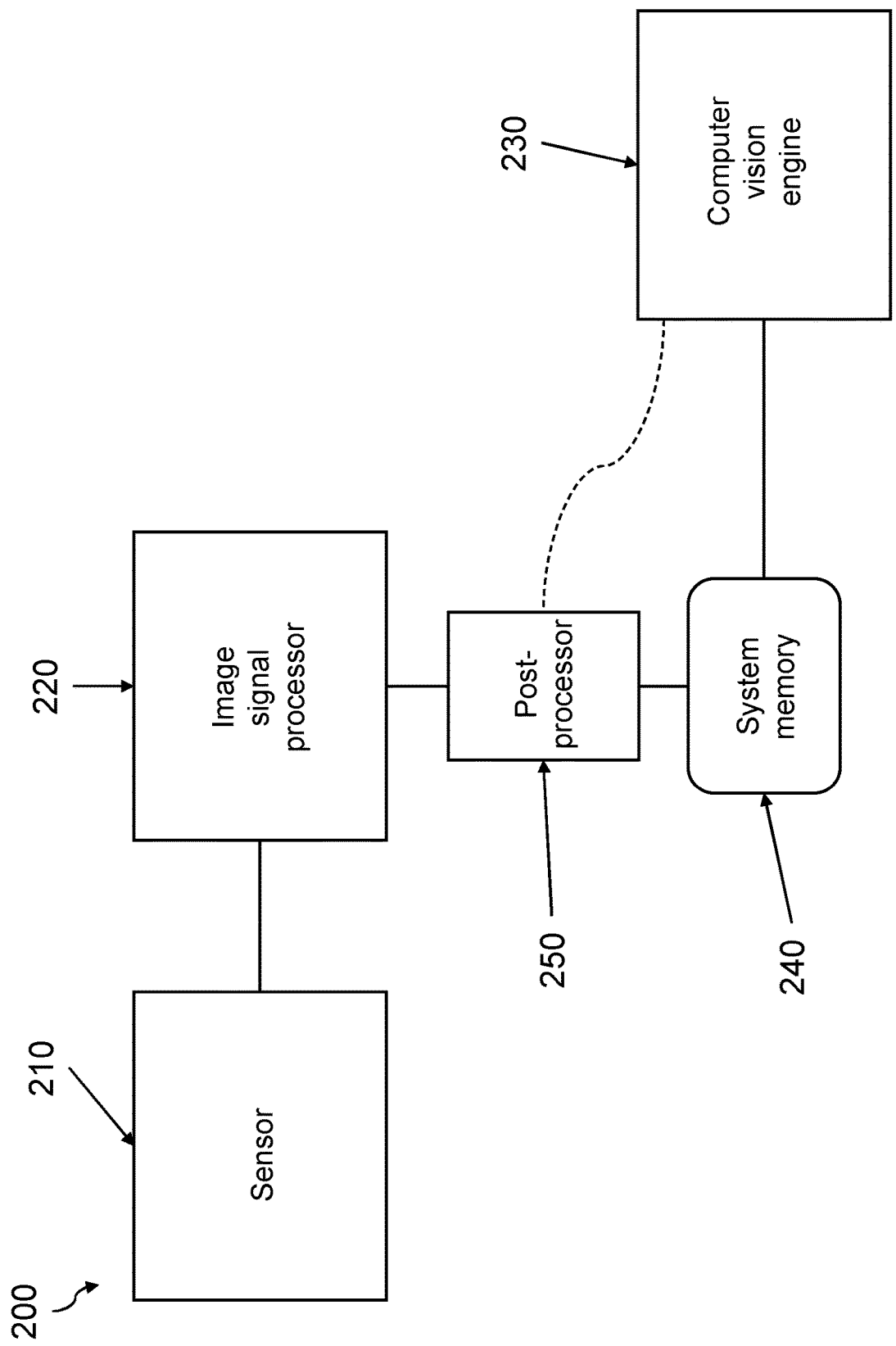
FIG. 2 shows a schematic depiction of an image processing system; according to the present disclosure.
Figure 3:
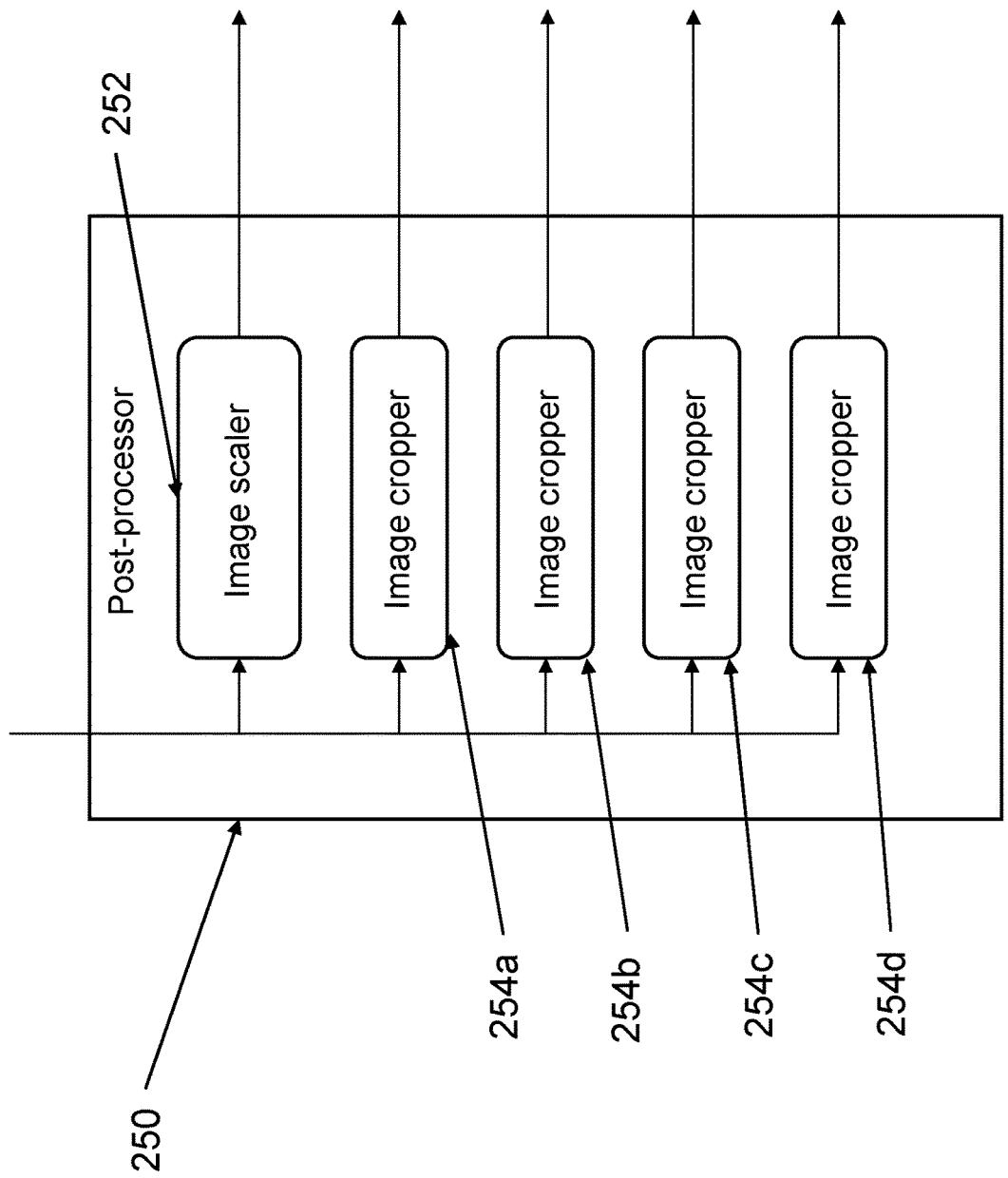
FIG. 3 shows a schematic depiction of an image post-processor.

FIG. 2 shows a schematic depiction of an image processing system 200 according to the present disclosure which comprises a sensor 210, which may be a camera or other sensor, an image signal processor (ISP) 220, a computer vision engine 230, system memory 240 and image post-processor 250. FIG. 3 shows a schematic depiction of the image post-processor 250, which comprises an image scaler 252 and a plurality of image croppers 254as, 254b, 254c, 254d. The operation of the image processing system 200 will now be described with reference to FIGS. 2 and 3. In use, data from the sensor is fed to the ISP, which performs a number of processes in order to produce a high quality image, such as, for example, denoising, demosaicing, color management, and tone-mapping. The resulting image is then streamed to the image scaler 252 and each of image croppers 254a, 254b, 254c, 254d. The image scaler downscales the received image such that it has a lower resolution and the reduced resolution image is then written to the system memory 240. The computer vision engine then analyses the reduced resolution image stored in the system memory to determine one or more regions of interest. The regions of interest can be determined in accordance with the nature of the image processing system. For example, if the image processing system is being used in an ADAS or an autonomous vehicle then the computer vision engine searches for regions of interest which comprise other vehicles, pedestrians, street furniture, signage, etc. Examples of detection algorithms which may be used to determine the regions of interest comprises Faster-RCNN, YOLO or SSD, which may be implemented using Convolutional Neural Networks (CNN), or HoG or SIFT features which may be classified using a support vector machine (SVM). For facial recognition systems, the Viola-Jones approach may be used. It should be understood from the following discussion that the specific method by which the regions of interest are determined is not relevant to the teaching of the present disclosure.

The computer vision engine may determine one or more regions of interest in the reduced resolution image stored in the system memory. If one or more regions of interest are detected then the computer vision engine sends a control message to the image post-processor (indicated by the dashed line in FIG. 2). The control message identifies the or each of the regions of interest—for example the or each region of interest may comprise a rectangular portion of the image and the or each region of interest may be defined by the four co-ordinates which define the respective rectangular portion of the image. The data identifying the or each region of interest is transferred to a respective image cropper 254, such that each region of interest is uniquely associated with a respective image cropper. For each of the image croppers which has received data relating to a region of interest, the image cropper crops the area associated with the region of interest from the high quality image streamed from the image processor and the cropped region is then written to the system memory. The system memory stores one or more cropped regions of the high quality image which can then be analyzed by the computer vision engine.

For example, for an image processing system according to the present disclosure deployed in an autonomous vehicle the computer vision engine will analyze the one or more cropped regions of the high quality image which are stored in the system memory. If the computer vision engine detects that the vehicle in front is braking, through the detection of the brake lights being activated, then a signal may be sent to decelerate the autonomous vehicle. Similarly, for an image processing system according to the present disclosure which is incorporated into an ADAS then the computer vision engine may detect that a pedestrian is walking into the road and may provide a visual or audible prompt to the driver if it appears that the driver is not taking some corrective action, for example slowing down or steering away from the pedestrian. It should be understood that the specific nature of the application in which the image processing system is used is not relevant to the teaching of the present disclosure.

It should be understood that the sensor may generate a sequence of images, for example the sensor may be a camera which is sending images at a rate of 60 frames per second. The method described above may be performed in the time period between successive images being received, such that the high quality image is downscaled and written to the system memory, regions of interest are detected by the computer vision engine from the downscaled image, the data identifying the regions of interest sent to the image post-processor, the regions of interest cropped from the high quality image, the cropped regions of the high quality image written to the system memory and those cropped regions are then analyzed further by the computer vision engine before the subsequent high quality image is received from the ISP at the image post-processor.

Such a sequence may be too demanding for the hardware which is typically deployed in such image processing systems. In an alternative, when a first image of a sequence of images is received at the image post-processor, the image can be downscaled and written to the system memory. The computer vision engine processes the downscaled image from the system memory and determines whether any regions of interest are present in the image. The data identifying the one or more regions of interest is then sent to the image post-processor such that the image croppers crop the region(s) of interest from the second image from the sequence of images. As further images are received, the region(s) of interest can be cropped from the image which is subsequent to the image in which the region(s) of interest were detected. Given that the images are being generated at a high rate, for example 60 frames per second, then the difference between an image and the subsequent image is likely to be minimal.

Figure 4:
FIG. 4 shows a pictorial depiction of a reduced resolution image generated by the image scaler.

FIG. 4 shows a pictorial depiction of a reduced resolution image 300, such as is generated by the image scaler. FIG. 5 shows a pictorial depiction of the high quality image which is received at the image post-processor from the ISP. FIG. 5 also shows the overlay of the region of interest data received from the computer vision engine on the high quality image received from the ISP. In this example, three regions of interest 410a, 410b, 410c have been identified, relating to pedestrians, a combination of vehicles and pedestrians and a road sign respectively. The cropped areas of the high quality image 500a, 500b, 500c which are associated with the three regions of interest 410a, 410b, 410c are also shown in FIG. 5. The three cropped areas of the high quality image may be written to the system memory for subsequent analysis by the computer vision engine. It can be seen that by only writing a fraction of the high quality image to the system memory for subsequent analysis it is possible to reduce the amount of system bandwidth which is consumed both by the writing of the image to system memory and then the subsequent retrieval of the image by the computer vision engine. By reducing the amount of system bandwidth which is required to for image processing then it is possible to obtain increased performance from the image processing hardware.

The image post-processor comprises a plurality of image croppers. Although FIG. 3 shows that the image post-processor comprises four image croppers (254a-254d) it should be understood that this is purely illustrative and should not be regarded as being limiting. The number of image croppers which are provided in the image post-processor may vary with the application in which the image processing system is used and with the available hardware used to implement the image processing system. It is thought that the number of image croppers may be between 8 and 16, although it should be understood that a lesser or greater number of image croppers may be provided in the image post-processor.

The image croppers 254a-254d may also be capable of scaling the cropped image, with the scaling of the image being variable and controllable. Some convolutional neural networks have specific image size requirements (for example, they only accept square images or images of fixed size such as, for example, 224 pixels by 224 pixels). Therefore, it may be useful to be able to rescale regions of interest to meet such requirements. It should be understood that transforming a region of interest to the predetermined size of image may involve downscaling the region of interest (if it is larger than the predetermined image size) or upscaling the region of interest (if it is smaller than the predetermined image size).

The computer vision engine comprises one or more processors. In particular, the computer vision engine may comprise general purpose central processing units (CPUs), graphical processing units (GPUs) and/or neural processing units (NPUs), which are of use in accelerating the processing of neural networks and other machine learning algorithms. It should be understood that the number and type of processors comprised in the computer vision engine depends on the application in which the image processing system is used. The system memory may be random access memory (RAM) and it should be understood that the amount of memory provided depends upon the number of sensors which are being used to generate images, the resolution of the sensors and the degree of downscaling which can be applied to images generated by the ISP.

The present disclosure may be incorporated into image processing systems which may be deployed, for example, in a vehicle, in which the image processing system comprises multiple sensors, which may be cameras. In such systems, each sensor may have its own dedicated ISP for processing the data provided from the sensor or there may be some degree of centralization, in which data from the multiple sensors are fed to one or more ISPs. The images generated from the one or more ISPs may be fed to one or more image post-processors. If an image post-processor were to comprise multiple image scalers then it would be possible for a single image post-processor to receive multiple image streams from one or more ISPs. It should be understood that in such a case the image post-processor should be provided with sufficient image croppers. For example, in accordance with the discussion above it is expected that between eight and sixteen image croppers may be provided for each image scaler which is comprised within an image post-processor. Similarly, the computer vision engine functionality may be centralized or distributed, such that a computer vision engine may be provided for each of multiple ISPs and image post-processors comprised within the image processing system or that a single computer vision engine may process the images generated by multiple ISPs and image post-processors. It should be understood that the processing capability of the computer vision engine(s), in terms of the number and type of processors, should be dimensioned appropriately.

The image streamed from the ISP may be downscaled in a number of different ways. For example, the image may be received as a Full HD (1920×1080) or 4K (3840×2160) signal and may be downscaled to a VGA (640×480) signal. It should be understood that a scaling factor of 2, i.e. where the number of pixels is halved for both the vertical and horizontal axes, would be a relatively easy scaling factor to implement. It should be understood that other scaling factors may be used and that the scaling factor for the image may be varied dynamically. It should be understood that if the scaling factor used is too large then it may not be possible to identify small objects of interest from the downscaled image. Furthermore, if the degree of downscaling applied is too small then it may not be possible to achieve the reduction in system bandwidth which can be provided by the present disclosure.

FIG. 5 shows an exemplary image in which three regions of interest have been identified. It should be understood that as the image captured by the sensors varies then the number of regions of interest that are detected by the computer vision engine may vary. For example, as a vehicle drives along a road then a vehicle which is driving in the opposite direction may pass out of view and may no longer constitute a region of interest. Alternatively, if a group of pedestrians were to disperse and start walking in different directions then one region of interest may become multiple regions of interest as the pedestrians move. Furthermore, other objects may converge such that a number of regions of interest become a single region of interest.

In some situations there may be no regions of interest—for example, if a vehicle is driving along a freeway in no traffic and with no visible signage then it is likely that there may be no regions of interest. In such a case, the computer vision engine may analyze each of the reduced resolution images which are written to the system memory by the image post-processor to determine if any regions of interest are present. Once a region (or regions) of interest have been identified in a reduced resolution image then the relevant data identifying the region(s) of interest can be transferred to one or more image croppers such that the cropped region(s) of the high quality image are written to the system memory for subsequent analysis by the computer vision engine. In the exemplary case of a vehicle driving along a freeway if another vehicle or overhead signage comes into view then it is likely that the computer vision engine would classify these as regions of interest for further analysis.

It should be appreciated that number of ROIs which can be analyzed is limited by the number of image croppers provided in the image post-processor. If the number of regions of interest detected in an image exceeds the number of image croppers then a number of the detected regions of interest may be combined to form a single region of interest. Whilst in theory a region of interest may have any shape it is most efficient if the regions of interest are rectangular. In the case where multiple regions of interest are combined to form a single region of interest the single region of interest may be defined by a single rectangle which incorporates all of the combined regions of interest. It should be understood that the single region of interest may also include some parts of the image which were not previously included in one of the multiple regions of interest. It should be understood that different regions of interest may overlap each other, for example if a pedestrian is detected standing next to a car. These regions of interest may be processed separately or they may be combined into a single region of interest.

In an alternative to the method described above, regions of interest may be determined for one image and then some form of estimation may be used to determine the position of those regions of interest for a plurality of subsequent images. For example, for a moving vehicle it may be possible to determine vectors for the or each regions of interest in accordance with the direction and speed of the vehicle. The vectors can then be used to determine the relative movement of the region(s) of interest within subsequent images. The vectors may also be used to vary the size of a region of interest. If an object is determined to be moving towards the camera then the vectors can be used to increase the size of a region of interest. If an object is determined to be moving away from the camera then the vectors can be used to decrease the size of a region of interest. The region(s) of interest may be re-determined on a periodic basis, for example after every 10 images.

The above embodiments are to be understood as illustrative examples of the disclosure. Further embodiments of the disclosure are envisaged. For example, although the preceding discussion has described the image post-processor as a separate element, it should be understood that the functionality of the image post-processor, and the hardware required to implement the image post-processor, may be incorporated into that of the ISP, or of other elements of an image processing system. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

Although at least some aspects of the embodiments described herein with reference to the drawings comprise computer processes performed in processing systems or processors, the disclosure also extends to computer programs, particularly computer programs on or in a carrier, adapted for putting the disclosure into practice. The program may be in the form of non-transitory source code, object code, a code intermediate source and object code such as in partially compiled form, or in any other non-transitory form suitable for use in the implementation of processes according to the disclosure. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

It should be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

What is claimed is:

1. An apparatus for processing an image, the apparatus comprising an image processor, an image post-processor, a computer vision engine, and system memory, wherein the apparatus is configured to:
   receive, at the image processor, data from a sensor;
   generate, at the image processor, an image at a first resolution;
   downscale, at the image post-processor, the image to a second resolution, wherein the second resolution is lower than the first resolution;
   analyze, at the computer vision engine, the image at the second resolution to detect a first region of interest in the image and a second region of interest in the image;
   crop, using a first image cropper of the image post-processor, a first area from the image at the first resolution to generate a first extract of the image at the first resolution, wherein the first area is associated with the first region of interest;
   crop, using a second image cropper of the image post-processor, a second area from the image at the first resolution to generate a second extract of the image at the first resolution, wherein the second area at least partly overlaps the first area and is associated with the second region of interest;
   write the first and second extracts of the image at the first resolution to the system memory so as to write a fraction of the image at the first resolution to the system memory; and
   analyze, at the computer vision engine, the first and second extracts of the image at the first resolution.

2. The apparatus of claim 1 wherein the image post-processor comprises an image scaler.

3. The apparatus of claim 2 wherein the image scaler is configured to dynamically vary the downscaling applied to the image generated at a first resolution by the image processor.

4. The apparatus of claim 1 wherein the first and second image croppers receive data defining the first and second region of interests, respectively, from the computer vision engine, the first and second image croppers generating the first and second extracts, respectively, in accordance with the received data.

5. The apparatus of claim 1 wherein the first and second image croppers are configured to transform the first and second extracts, respectively, such that the first and second extracts have a predetermined size.

6. The apparatus of claim 1 wherein the image post-processor is configured to write the image at the second resolution to the system memory such that the computer vision engine can analyze the image at the second resolution.

7. The apparatus of claim 1 wherein the apparatus further comprises one or more sensors.

8. A method of image processing, the method comprising:
   receiving data from a sensor at an image processor;
   processing the data received from the sensor to generate an image, the image having a first resolution;
   processing the image having a first resolution such that it has a second resolution, wherein the second resolution is less than the first resolution;
   analyzing the image having a second resolution using a computer vision engine to detect a first region of interest in the image and a second region of interest in the image;

cropping, using a first image cropper, the first region of interest from the image having a first resolution to extract the first region of interest from the image having the first resolution;

cropping, using a second image cropper, the second region of interest from the image having a first resolution to extract the second region of interest from the image having the first resolution, wherein the second region of interest at least partly overlaps the first region of interest;

writing the first and second regions of interest extracted from the image having the first resolution to system memory so as to write a fraction of the image having the first resolution to the system memory; and analyzing the first and second regions of interest extracted from the image having the first resolution using the computer vision engine.

9. The method of claim 8 wherein data is received from the sensor such that the image processor generates a sequence of images each having a first resolution, the method further comprising:

processing a first image from the sequence of images, such that the first image has a resolution less than the first resolution;

analyzing the first image having the resolution less than the first resolution to detect one or more regions of interest in the first image; and extracting the one or more regions of interest from a second image from the sequence of images, the second image subsequent to the first image.

10. The method of claim 8 wherein analyzing the image having a second resolution using the computer vision engine comprises:

analyzing the image using the computer vision engine to detect a third region of interest in the image and a fourth region of interest in the image; and combining the third and fourth regions of interest in the image to obtain the second region of interest.

11. The method of claim 8, wherein one or more of the first and second regions of interest are transformed such they correspond to a predetermined number of pixels.

12. An image processing system, the image processing system comprising:

a sensor;

an image processor configured to receive data from the sensor and to generate an image having a first resolution;

an image post-processor configured to transform the image such that it has a second resolution, such that the second resolution is less than the first resolution, and to write the transformed image to a system memory;

a computer vision engine configured to analyze the transformed image to detect a first region of interest and a second region of interest and to send data identifying the first and second regions of interest to the image post-processor;

the image post-processor being further configured to:

crop, using a first image cropper, a first area from the image having the first resolution to extract the first region of interest identified by the computer vision engine from the image having the first resolution;

crop, using a second image cropper, a second area from the image having the first resolution to extract the second region of interest identified by the computer vision engine from the image having the first resolution, wherein the second area at least partly overlaps the first area; and write the first and second regions of interest of the image having the first resolution to the system memory so as to write a fraction of the image having the first resolution to the system memory;

wherein the computer vision engine is further configured to analyze the first and second regions of interest of the image having the first resolution written to the system memory.

13. The image processing system of claim 12, wherein the image post-processor comprises an image scaler.

14. The image processing system of claim 13, wherein the image scaler is configured to dynamically vary the downscaling applied to the image having the first resolution by the image processor.

15. The image processing system of claim 12, wherein the first and second image croppers are configured to transform the first and second regions of interest, respectively, such that the first and second regions of interest have a predetermined size.

16. The image processing system of claim 12, wherein to analyze the transformed image to detect the second region of interest, the computer vision engine is configured to:

analyze the transformed image to detect a third region of interest and a fourth region of interest; and combine the third and fourth regions of interest in the image to obtain the second region of interest.

* * * * *